US012654146B2

(12) United States Patent  (10) Patent No.: US 12,654,146 B2
McMillan  (45) Date of Patent: Jun. 16, 2026

(54) FLUIDIZATION MEASUREMENT SYSTEM

(71) Applicant: ExxonMobil Technology and Engineering Company, Annandale, NJ (US)

(72) Inventor: Billy D. McMillan, Spring, TX (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 1059 days.

(21) Appl. No.: 17/779,066

(22) PCT Filed: Nov. 11, 2020

(86) PCT No.: PCT/US2020/060021
§ 371 (c)(1),
(2) Date: May 23, 2022

(87) PCT Pub. No.: WO2021/113040
PCT Pub. Date: Jun. 10, 2021

(65) Prior Publication Data
US 2022/0339593 A1  Oct. 27, 2022

Related U.S. Application Data

(60) Provisional application No. 62/944,016, filed on Dec. 5, 2019.

(51) Int. Cl.
*B01J 8/18* (2006.01)
*C08F 10/02* (2006.01)
(Continued)

(52) U.S. Cl.
CPC .......... *B01J 8/1809* (2013.01); *B01J 8/1827* (2013.01); *B01J 8/1872* (2013.01); *C08F 10/02* (2013.01);
(Continued)

(58) Field of Classification Search
USPC ...................................................... 526/61, 68
See application file for complete search history.

(56) References Cited

U.S. PATENT DOCUMENTS

2004/0030063 A1  2/2004  Viertel et al.

FOREIGN PATENT DOCUMENTS

CN  108661717 A  10/2018
WO  2009014682 A2  1/2009

OTHER PUBLICATIONS

Machine-generated English language translation of CN 108661717A, 15 pages, published Oct. 16, 2018, retrieved from ESPACENET on Nov. 13, 2025. (Year: 2018).*

(Continued)

*Primary Examiner* — Fred M Teskin
(74) *Attorney, Agent, or Firm* — Vorys, Sater, Seymour and Pease, LLP

(57) ABSTRACT

A fluidization measurement system for a gas phase reactor containing a fluidized bed includes a measurement probe coupled to a sidewall of the gas phase reactor. The measurement probe includes a support bar penetrating the sidewall and extending into the fluidized bed to a distance of at least 12% of a diameter of the gas phase reactor, and a plurality of sensors arranged along a length of the support bar to obtain measurements of at least one of temperature, pressure, and electrostatic charge at multiple points within the fluidized bed. A base plant control system is in communication with measurement probe to receive and process the measurements to determine real-time physical conditions and flow patterns of the fluidized bed.

20 Claims, 2 Drawing Sheets

(51) Int. Cl.
    *C08F 10/06*         (2006.01)
    *G01K 3/14*         (2006.01)

(52) U.S. Cl.
    CPC ................ *C08F 10/06* (2013.01); *G01K 3/14*
        (2013.01); *B01J 2208/00061* (2013.01); *B01J*
            *2208/00539* (2013.01); *B01J 2208/00734*
        (2013.01); *B01J 2208/00902* (2013.01); *B01J*
                      *2208/00938* (2013.01)

(56)            References Cited

OTHER PUBLICATIONS

Written opinion and International Search Report for PCT application No. PCT/US2020/060021 mailed Feb. 25, 2021.

* cited by examiner

FLUIDIZATION MEASUREMENT SYSTEM

FIELD

The present disclosure is related to gas phase reactors and, more particularly, to measurement probes that extend deep into the fluidized bed contained within the gas phase reactor to obtain measurements of at least one of temperature, pressure, and electrostatic charge at multiple points within the fluidized bed.

BACKGROUND

Polyolefins are polymeric materials produced from olefins and are commonly used in the manufacture of packaging, household goods, automotive components, etc. Polyolefins, such as polyethylene (PE) and polypropylene (PP), can be produced in a fluidized gas phase reactor that facilitates a polymerization reaction in the presence of a catalyst. Fluidized gas phase reactors have been in commercial operation since the 1970's.

Operating gas phase reactors includes feeding an active catalyst into the reactor, typically into the volume of a fluidized bed contained within the reactor and in the form of nascent catalyst granules (e.g., a prepolymerized catalyst granules, or polymer granules containing a residual catalyst). One or more gases (e.g., ethylene, propylene, hydrogen, etc.) are circulated in various concentrations into the reactor via a distribution plate arranged near the bottom of the gas phase reactor. These gases are circulated through the fluidized bed to fluidize the bed and control product properties and production rate. The incoming catalyst and/or polymer undergoes polymerization within the fluidized bed to generate solid polymeric granules such as polyethylene and/or polypropylene. A mixture of the solid polymeric granules and the gases is continuously or semi-continuously removed from the reactor and conveyed to a granules handling system where the solid polymeric granules are separated from the gas as product, and the gas is recovered, treated, and/or recycled back to the reactor.

Fluidized beds of gas phase reactors experience very different hydrodynamic patterns when operating at elevated pressures and temperatures. For instance, gas-solid fluidized beds are typically nonlinear and chaotic dynamic systems, with both irregular and nonrandom characteristics. Such hydrodynamic characteristics are governed by complicated nonlinear dynamic relationships, which are mainly controlled by different dynamic phenomena occurring inside the bed including, but not limited to, bubble formation, bubble coalescence and splitting, bubble passage, particle movement, as well as cluster motion.

Understanding and modeling changes in fluidization circulation patterns and solids concentrations in the fluidized bed is essential to improving reactor performance. Conditions within the fluidized bed are currently monitored using pressure and temperature probes limited to obtaining measurements of conditions that exist at or near the exterior of the fluidized polymer bed (i.e., near the inner reactor wall). Consequently, existing pressure and temperature measurement practices fail to monitor core conditions near the center and annular regions of the fluidized bed, thus resulting in computer simulation uncertainty and model inaccuracies.

Obtaining process measurements that indicate where the catalyst/polymer particles are approaching lower velocities can enhance knowledge on the obscure flow regime within the fluidized bed. Catalyst utilization and development can be improved based on that knowledge by fine-tuning reactor production conditions, thus minimizing or mitigating reactor upset conditions. Being able to detect and discern bed circulation changes will provide information for corrective actions (i.e., manipulating specific process variables) to mitigate adverse effects.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Embodiments described herein disclose fluidization measurement systems for gas phase reactors containing a fluidized polymer bed. The fluidization measurement system includes a measurement probe coupled to a sidewall of the gas phase reactor, and the measurement probe can include a support bar penetrating the sidewall and extending into the fluidized bed to a distance of at least 25% of a diameter of the gas phase reactor. A plurality of sensors may be arranged along a length of the support bar to obtain measurements of at least one of temperature, pressure, and electrostatic charge at multiple points within the fluidized bed. A base plant control system is in communication with the measurement probe to receive and process the measurements and thereby determine real-time physical conditions and flow patterns of the fluidized bed.

Conventional measurement probes for gas phase reactors only exist along the vessel walls, which prevents accurate profiling of fluidization effects near the center of the fluidized bed. The measurement probe described herein is capable of capturing multiple temperature and pressure measurements extending several feet into the fluidized bed, and is further capable of withstanding the heat, pressure, and turbulent dynamics in the reactor environment. Extended reach into the fluidized polymer environment allows for accurate profiling of physical conditions and flow patterns.

Figure 1:
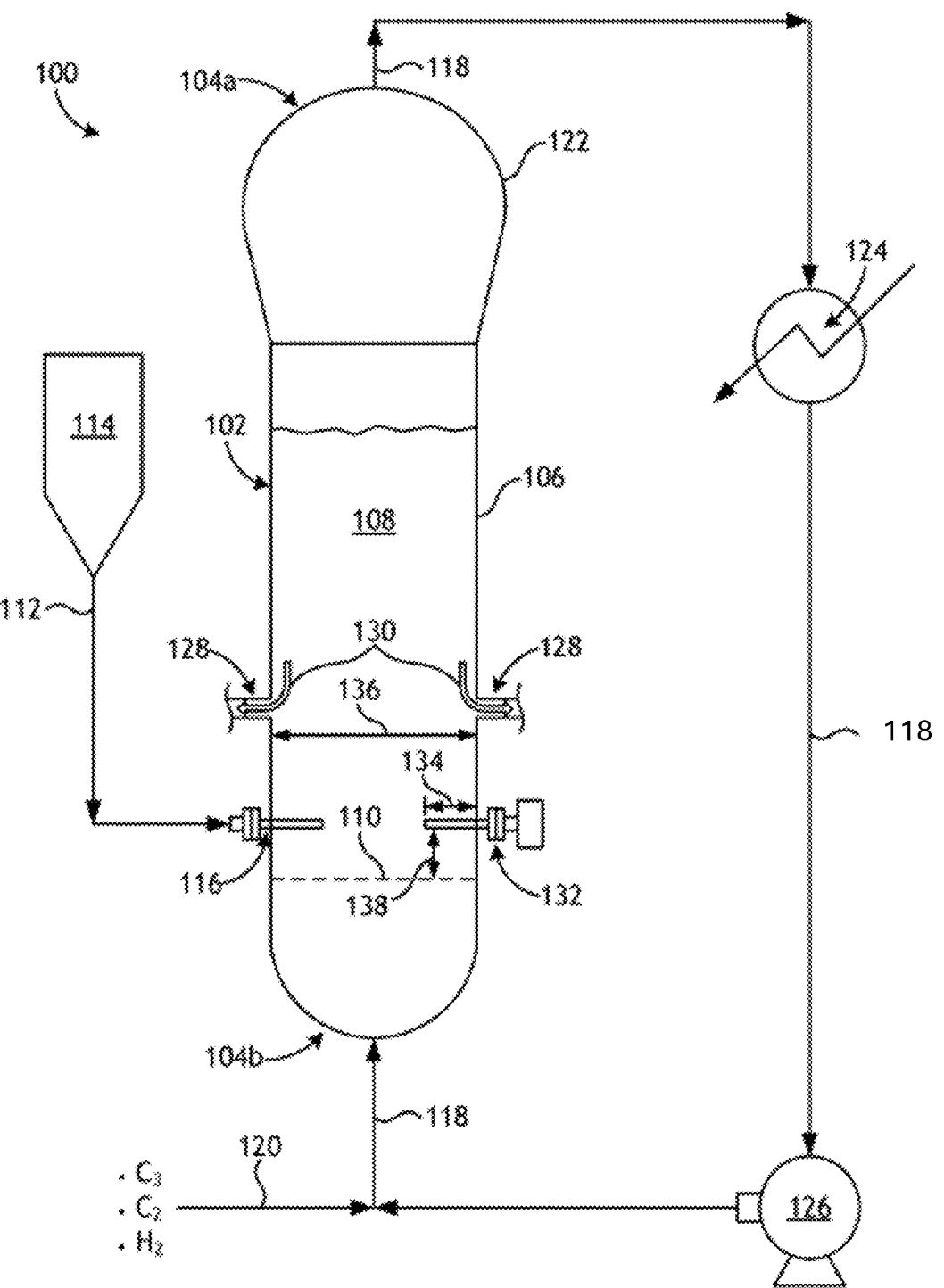
FIG. 1 is a schematic diagram of an example gas phase reactor system operable to create and discharge polymeric granules, according to one or more embodiments.

FIG. 1 is a schematic diagram of an example fluidized gas phase reactor system 100 operable to create and discharge solid polymeric granules in accordance with the principles of the present disclosure. As illustrated, the system 100 may include a gas phase reactor 102 (alternately referred to herein as "reactor 102"), which may generally comprise an enclosed vessel having a top 104a, a bottom 104b, and a substantially vertical sidewall 106 extending between the top 104a and the bottom 104b. In at least one embodiment, the system 100 may be designed to polymerize propylene and ethylene under controlled conditions to produce an amorphous bipolymer rubber (aEP) within a porous polypropylene homopolymer that has been fed into the reactor 102 with residual catalyst activity, thus imparting an impact resistance to the polypropylene and discharge an impact copolymer (ICP) in the form of solid polymeric granules.

The reactor 102 may contain a fluidized bed 108 situated above a distributor plate 110 arranged within the interior of the reactor 102 near the bottom 104b. A feed of catalyst or active polymer granules 112 (e.g., a polymer and an active catalyst) may be continuously or intermittently conveyed into the reactor 102 from an upstream system 114. In at least one application, the active polymer granules 112 may comprise a homopolymer, and the upstream system 114 may feed the active polymer granules 112 into the reactor 102 based on the production rate of an upstream reactor (not shown).

In one or more aspects, the active polymer granules 112 may be fed into the reactor 102 via one or more support tubes 116 (one shown) coupled (e.g., welded) to the sidewall 106 and extending into the fluidized bed 108. While only one support tube 116 is depicted in FIG. 1, more than one may be employed to inject the active polymer granules 112 into the reactor 102. In some embodiments, as illustrated, the support tube(s) 116 may be located just above the distributor plate 110. In such embodiments, the support tube(s) 116 may be coupled to the sidewall 106 between about 3 feet and about 6 feet above the distributor plate 110, and can extend 3 to 4 feet into the fluidized bed 108. Polyethylene gas phase reactors, for example, will have support tubes 116 located at the 4 foot and 6 foot levels above the distributor plate 110. In other embodiments, however, the support tube(s) 116 may be located at other locations along the sidewall 106, such as at or near the top of the fluidized bed 108, and may extend into the fluidized bed 108 more or less than 3 to 4 feet.

A fluidizing gas 118 is also continuously fed into the reactor 102 at or near the bottom 104b of the reactor 102 to fluidize the fluidized bed 108. The fluidizing gas 118 can include a variety of gases and substances (besides various reactive monomers), such as an inert gas, a catalyst modifier, and a catalyst activator. A monomer make-up line 120 may add reactive monomers, such as ethylene ($C_3$), propylene ($C_2$), and hydrogen ($H_2$) to the fluidizing gas 118 to control product properties and production rate of the reactor 102.

The distributor plate 110 supports the fluidized bed 108 within the reactor 102 and comprises a porous or perforated structure that receives and distributes the fluidizing gas 118 over the cross-sectional area of the reactor 102. The high velocity at which the fluidizing gas 118 flows through the distributor plate 110 and into the reactor 102 causes uniform fluidization of the fluidized bed 108. During operation of the reactor 102, the fluidized bed 108 may contain a fluidized combination of polymer, catalyst, polymer in the process of being formed into solid polymeric granules, solid polymeric granules, and the fluidizing gas 118 that maintains fluidization.

The portion of the fluidizing gas 118 that does not react while circulating through the fluidized bed 108 is discharged from the reactor 102 at or near the top 104a. In some embodiments, as illustrated, the top 104a of the reactor 102 may be enlarged and otherwise define an expanded dome 122 configured to reduce the upward velocity of the circulating fluidizing gas 118, which discourages entrainment of polymerizing particles and granules within the exiting fluidizing gas 118. Instead, gravitational forces urge the polymerizing particles and granules out of circulation with the fluidizing gas 118 and back downward within the reactor 102, largely along the inner wall(s) of the sidewall 106.

As the fluidizing gas 118 circulates through the fluidized bed 108, it absorbs heat generated by the chemical reaction occurring within the fluidized bed 108. The fluidizing gas 118 exiting the reactor 102 at the top 104a may be conveyed to a heat exchanger 124 (e.g., a cooler) fluidly coupled to the reactor 102 to remove the heat of polymerization from the fluidizing gas 118 and thereby help control the temperature inside the reactor 102. A pump or compressor 126 provides the motive force to circulate the fluidizing gas 118 through the heat exchanger 124 to remove heat from the system 100 and recycle the fluidizing gas 118 back to the reactor 102.

The system 100 may further include one or more valves or valve assemblies 128 (two shown) coupled to the sidewall 106 of the reactor 102 and configured to remove solid polymeric granules (e.g., polymerizing granules) created (generated) from the chemical reaction occurring within the reactor 102. During operation of the reactor 102, a mixture 130 of the fluidizing gas 118 and the solid polymeric granules is received at the valve assembly(ies) 128 and continuously (or semi-continuously) drawn (removed) from the reactor 102. This mixture 130 is conveyed to a granules handling system where the solid polymeric granules are separated from the fluidizing gas 118 as product, and the fluidizing gas 118 is recovered, treated, and recycled back to the reactor 102.

Temperatures within the reactor 102 generally range between about 30° C. and about 200° C. during operation. The temperature of the fluidized bed 108 may be held constant at a steady state dependent on one or more of the following factors: fluidized particle softening/sticking point; the rate of injection of catalyst or active polymer granules 112 and the catalyst activity; the temperature, pressure, and composition of the fluidizing gas 118 entering the reactor 102; and the volume of the fluidizing gas 118 circulating through the fluidized bed 108. The pressure within the reactor 102 may range between about 650 KPa and about 15 MPa.

Gas phase reactors, such as the reactor 102, typically include various measurement probes designed to measure real-time temperature, pressure, and electrostatic charge within the fluidized bed 108. As the temperature, pressure, and flow rates within the reactor 102 vary, bubbles can develop within the fluidized bed 108, and the bubbles can eventually develop into sheets, chunks, and globules of polymerizing material that circulate within the reactor 102 and can potentially impact (e.g., strike) the measurement probes extending into the fluidized bed 108. Consequently, temperature sensors (i.e., thermocouples) in conventional gas phase reactors are commonly enclosed in a metallic thermowell and extend only six inches or less into the fluidized bed 108. Similarly, pressure sensors in conventional gas phase reactors commonly comprise a purged port into the reactor (vessel) environment, which limits pressure measurements to conditions that exist at the exterior of the fluidized bed 108. Since the average diameter of reactor vessels can range between 14 to 16 feet, existing temperature and pressure measurement practices in conventional gas phase reactors fail to monitor core conditions near the center of the fluidized bed 108, which results in computer simulations uncertainty and model inaccuracies.

According to embodiments of the present disclosure, one or more measurement probes 132 (one shown), alternately referred to as "measurement assemblies," may be coupled to the sidewall 106 of the reactor 102 and extend into the fluidized bed 108 to measure at least one of temperature, pressure, and electrostatic charge within the fluidized bed 108. While only one measurement probe 132 is depicted in FIG. 1, more than one may be employed, without departing from the scope of the disclosure. In a preferred embodiment, two or more measurement probes 132 may be employed on the reactor 102 and positioned on opposite sides of the sidewall (i.e., two spaced 180° apart, three spaced 120° apart, etc.).

As discussed herein, the measurement probe(s) 132 may comprise multi-point measurement devices configured to obtain measurements at multiple points along the length of the measurement probe(s) 132. Moreover, the measurement probe(s) 132 may have a length 134 that extends into the fluidized bed 108 to a distance of at least 12% of the diameter 136 of the reactor 102. With proper materials and placement, it is contemplated herein that the length 134 of the measurement probe(s) 132 may extend into the fluidized bed 108 up to 50% of the diameter 136, without departing from the scope of the disclosure. As will be appreciated, as compared to conventional measurement probes/techniques, this facilitates extended measurement reach into the fluidized polymer environment, which allows for more accurate profiling of physical conditions and flow patterns within the fluidized bed 108. More specifically, vital temperature and pressure measurements will be obtained not just at or near the inner wall of the reactor 102, but also closer to the center and within the annular regions of the fluidized bed 108.

In some embodiments, the measurement probe(s) 132 may be located just above the distributor plate 110 and at a height 138 ranging between about 3 feet and about 6 feet above the distributor plate 110. In at least one embodiment, the measurement probe 132 may penetrate the sidewall 106 of the reactor 102 at a location of an unused support tube 116 (FIG. 1). In such embodiments, the support tube 116 may be removed from the sidewall 106 and the measurement probe 132 may be installed in its place in a simple device swap, thus not requiring substantial modifications to the reactor 102. In other embodiments, however, the measurement probe(s) 132 may be coupled to the sidewall 106 and extend into the fluidized bed 108 at any other location or height, such as about 30 feet to about 40 feet above the fluidized bed 108, without departing from the scope of the disclosure.

Figures 2A, 2B:
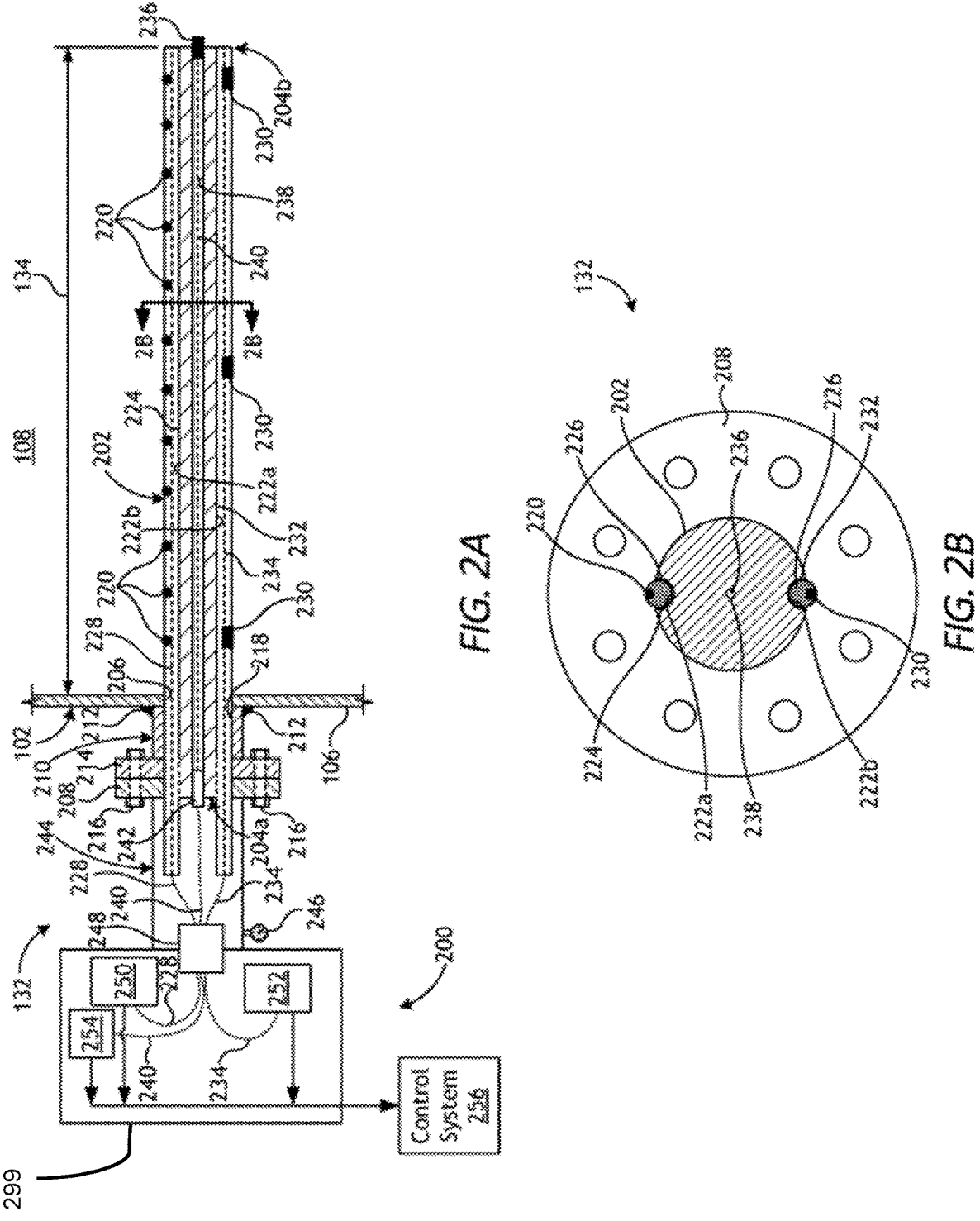
FIG. 2A is an enlarged partial cross-sectional side view of one example of the measurement probe of FIG. 1, according to one or more embodiments.
FIG. 2B is a cross-sectional end view of the measurement probe taken along lines 2B-2B in FIG. 2A.

FIG. 2A is an enlarged partial cross-sectional side view of one example of the measurement probe 132 of FIG. 1, according to one or more embodiments, and FIG. 2B is a cross-sectional end view of the measurement probe 132 taken along the lines 2B-2B in FIG. 2A. The measurement probe 132 may form part of a fluidization monitoring system 200 configured to model changes in fluidization circulation patterns and solids concentrations within the fluidized bed 108. More specifically, the measurement probe 132 may be configured to obtain process measurements within the fluidized bed 108 and the fluidization monitoring system 200 may use these process measurements to indicate where catalyst/polymer particles are approaching lower velocities, which may enhance knowledge on the real-time flow regime within the fluidized bed 108. With this knowledge, catalyst utilization and development can be improved, production conditions of the reactor 102 can be fine-tuned, and upset conditions can be minimized or mitigated altogether. Moreover, being able to detect and discern circulation changes will provide information for corrective actions to mitigate adverse effects, which may prove advantageous in realizing reactor 102 performance improvements.

As illustrated, the measurement probe 132 includes a support bar 202, which may comprise a generally cylindrical rod having a first end 204a and a second end 204b opposite the first end 204a. In some embodiments, as illustrated, the support bar 202 may exhibit a circular cross-sectional shape, but in other embodiments, the support bar 202 may exhibit other cross-sectional shapes, such as oval, ovoid, or polygonal (e.g., square, rectangular, pentagonal, octagonal, etc.), without departing from the scope of the disclosure. Moreover, in some embodiments, the support bar 202 may have a generally constant diameter along the length 134 between the first and second ends 204a,b. In other embodiments, however, the diameter of the support bar 202 may vary at one or more locations along the length 134, without departing from the scope of the disclosure.

As indicated above, the length 134 of the measurement probe 132 and, more specifically, the length 134 of the support bar 202 extending from the inner wall of the sidewall 106, may allow the measurement probe 132 to extend into the fluidized bed 108 to a distance of at least 12% the diameter 136 (FIG. 1) of the reactor 102, but could conceivably extend up to 50% of the diameter 136, without departing from the scope of the disclosure. If the diameter 136 of the reactor 102 is between about 14 to 16 feet, for example, then the length 134 that the support bar 202 extends into the fluidized bed 108 from the sidewall 106 may range between about 3 feet and about 4 feet. As a result, and in contrast to conventional reactor probes and measurement devices, the support bar 202 will be able to monitor core conditions closer to the center and within the annular regions of the fluidized bed 108.

The support bar 202 may be made of a variety of materials capable of withstanding the heat, pressure, and turbulent dynamics of the fluidized bed 108 within the interior of the reactor 102. Suitable materials for the support bar 202 include stainless steel and steel alloys, but could also include other metals and metal alloys.

The second end 204b of the support bar 202 is configured and otherwise sized to penetrate the sidewall 106 of the reactor 102 via an aperture 206 defined in the sidewall 106. A flange 208 may be coupled to the outer radial surface of the support bar 202 to help secure the measurement probe 132 to the reactor 102. More specifically, in some embodiments, a nozzle 210 may be secured to the outer surface of the sidewall 106, such as by one or more welds 212, and extend radially outward therefrom. The nozzle 210 provides a flange 214 matable with the flange 208 of the measurement probe 132, and the flanges 208, 214 may be secured to each other using one or more mechanical fasteners 216 (e.g., flange bolts). The nozzle 210 defines a central passage 218 generally aligned (collinear) with the aperture 206 in the sidewall 106, and the measurement probe 132 can be secured to the sidewall 106 of the reactor 102 by extending the second end 204b of the support bar 202 through the central passage 218 and the aperture 206. The second end 204b is then advanced into the interior of the reactor 102 until the flanges 208, 214 meet and can then be secured with the mechanical fasteners 216. Securing the flanges 208, 214 together creates a sealed interface between the measurement probe 132 and the nozzle 210 at that location.

In some embodiments, the nozzle 210 may be initially or originally designed to receive and secure one of the support tubes 116 (FIG. 1) that extend into the reactor 102 to inject the active polymer granules 112 (FIG. 1) into the reactor 102. In such embodiments, as briefly mentioned above, the support tube 116 may be detached from the nozzle 210 and replaced with the measurement probe 132 in a simple device swap. Accordingly, it is contemplated herein that the measurement probe 132 has generally the same diameter as the support tube 116 to enable the measurement probe 132 to be installed at a location that previously accommodated the support tube 116. As will be appreciated, this may prove advantageous in not requiring any modifications to the reactor 102 to be able to use the measurement probe 132.

The measurement probe 132 may further include one or more measurement devices or sensors arranged at multiple points along the length 134 of the support bar 202 to enable measurement of at least one of the temperature, pressure, and/or electrostatic charge within the fluidized bed 108 at multiple points. More particularly, in some embodiments, the measurement probe 132 may include at least one, but more preferably, a plurality of temperature sensors 220 arranged along the length 134 of the support bar 202. The temperature sensors 220 may comprise, for example, individual thermocouples positioned within a first arcuate channel 222a defined in the outer surface of the support bar 202. In some embodiments, a temperature sensor housing 224 may be arranged within the first arcuate channel 222a and the temperature sensors 220 may be received within the temperature sensor housing 224.

As best seen in FIG. 2B, at least one of the temperature sensors 220 may protrude slightly out of the first arcuate channel 222a and past the outer radial surface of the support bar 202 to expose the temperature sensor 220 to the surrounding environment within the fluidized bed 108. In some embodiments, the first arcuate channel 222a may be packed with a packing material 226 that helps hold the temperature sensors 220 in place within the first arcuate channel 222a and may further help seal the first arcuate channel 222a. The packing material 226 may comprise, for example, a non-conductive, mineral fiber packing material.

In some embodiments, the temperature sensors 220 are equidistantly spaced along the length 134 of the support bar 202. In such embodiments, the temperature sensors 220 may be spaced from each other by a known distance, such as by about two inches, but may be alternatively spaced from each other at intervals greater or less than two inches. In other embodiments, however, the temperature sensors 220 may be non-equidistantly spaced from each other, without departing from the scope of the disclosure. In any spacing arrangement, the exact location of each temperature sensor 220 will be known so that measurements obtained by each temperature sensor 220 can be correlated with a known location within the fluidized bed 108 by the fluidization monitoring system 200.

While twelve temperature sensors 220 are depicted in FIG. 2A, it is contemplated herein to include more or less than twelve, without departing from the scope of the disclosure. As shown in FIG. 2A, an electrical conductor 228 is arranged within the first arcuate channel 222a and extends to each temperature sensor 220. For ease of viewing, only one electrical conductor 228 is depicted, but the electrical conductor 228 is representative of a plurality of electrical conductors 228, where each electrical conductor 228 extends to a corresponding one of the temperature sensors 220. In the illustrated embodiment, for example, since there are twelve temperature sensors 220, there would be twelve corresponding electrical conductors 228 entering the first arcuate channel 222a, one electrical conductor 228 extending to each temperature sensor 220. Each electrical conductor 228 may comprise a heat-rated wire configured to withstand the elevated temperatures and conditions typical of the fluidized bed 108 environment.

In some embodiments, the measurement probe 132 may further include one or more pressure sensors 230 arranged along the length 134 of the support bar 202. The pressure sensors 230 may be positioned within a second arcuate channel 222b defined in the outer surface of the support bar 202. In some embodiments, a pressure sleeve or tubing 232 may be arranged within the second arcuate channel 222b and the pressure sensors 230 may be received within the pressure tubing 232. In some embodiments, as illustrated, the first and second arcuate channels 222a,b may be angularly offset from each other on the support bar 202 by 180°. In other embodiments, however, the first and second arcuate channels 222a,b may be angularly offset from each other by a magnitude greater or less than 180°, without departing from the scope of the disclosure. In at least one embodiment, the first and second arcuate channels 222a,b may comprise the same arcuate channel and the temperature and pressure sensors 220, 230 may be arranged in the same arcuate channel. In yet other embodiments, the measurement probe 132 may provide multiple first and second arcuate channels 222a, and each arcuate channel 222a,b may house isolated pluralities of temperature sensors 220 or pressure sensors 230, respectively.

As best seen in FIG. 2B, one or more of the pressure sensors 230 may protrude slightly out of the second arcuate channel 222b and may otherwise be exposed to the surrounding environment within the fluidized bed 108. Similar to the first arcuate channel 222a, the second arcuate channel 222b may be packed with the packing material 226, which may help hold the pressure sensors 230 in place within the second arcuate channel 222b and may further help seal the second arcuate channel 222b.

While three pressure sensors 230 are depicted in FIG. 2A, it is contemplated herein to include more or less than three, without departing from the scope of the disclosure. In some embodiments, the pressure sensors 230 are equidistantly spaced along the length 134 of the support bar 202, but may alternatively be non-equidistantly spaced from each other, without departing from the scope of the disclosure. In any spacing arrangement, the exact location of each pressure sensor 230 will be known so that measurements obtained by each pressure sensor 230 can be correlated with a known location within the fluidized bed 108 by the fluidization measurement system 200.

As shown in FIG. 2A, an electrical conductor 234 is arranged within the second arcuate channel 222b and extends to each pressure sensor 230. For ease of viewing, only one electrical conductor 234 is depicted, but the electrical conductor 234 is representative of a plurality of electrical conductors 234, where each electrical conductor 234 extends to a corresponding one of the pressure sensors 230. In the illustrated embodiment, for example, since there are three pressure sensors 230 arranged within the second arcuate channel 222b, there would be three corresponding electrical conductors 234, one electrical conductor 234 extending to each pressure sensor 230. Moreover, similar to the electrical conductors 228 in the first arcuate channel 222a, the electrical conductors 234 in the second arcuate channel 222b may comprise heat-rated wire capable of withstanding the extreme temperatures and conditions typical of the fluidized bed 108 environment.

In some embodiments, the measurement probe 132 may further include one or more electrostatic sensors 236 (one shown) used to obtain electrostatic charge measurements within the fluidized bed 108, which may help determine the static relationship between the different zones in the fluidized bed 108. In the illustrated embodiment, the electrostatic sensor 236 is positioned at the second end 204b of the support bar 202, but could alternatively be positioned at any other location along the length 134 of the support bar 202. In at least one embodiment, as illustrated, an elongate conduit 238 may be defined (e.g., rifle drilled) in the support bar 202 and extend between the first and second ends 204a,b. The electrostatic sensor 236 may be at least partially arranged within the elongate conduit 238 at the tip of the support bar 202 at the second end 204b.

As shown in FIG. 2A, an electrical conductor 240 is arranged within the elongate conduit 238 and extends to the electrostatic sensor 236. A first or "primary" seal 242 is included at the first end 204a of the support bar 202 to seal the elongate conduit 238, and the electrical conductor 240 extends through the primary seal 242. In some embodiments, the primary seal 242 may comprise a pressure-rated, rubber seal system, but could otherwise comprise any other seal system capable of sufficiently sealing the first end 204a of the support bar 202.

Referring specifically to FIG. 2A, the measurement probe 132 may further include a secondary containment chamber 244 operatively coupled to the support bar 202 at the first end 204a. In some embodiments, the secondary containment chamber 244 may be welded to the flange 208, but could alternatively be coupled to the first end 204a of the support bar 202, or both the flange 208 and the first end 204a of the support bar 202. In any event, operatively coupling the secondary containment chamber 244 to the support bar 202 may result in converting the secondary containment chamber 244 to a sealed vessel. In some embodiments, a pressure gauge 246 may be coupled to the secondary containment chamber 244 and configured to monitor the pressure within the secondary containment chamber 244. If the pressure gauge 246 detects a spike in pressure, that could be an indication that the primary seal 242 or the seal against the flange 208 has been compromised. In such an event, an operator may be alerted to a potential pressure leak at the secondary containment chamber 244.

In some embodiments, as illustrated, one or both of the temperature sensor housing 224 and the pressure tubing 232 may extend past the first end 204a of the support bar 202 and into the secondary containment chamber 244. In at least one embodiment, the temperature sensor housing 224 and the pressure tubing 232 may each have a silver solder type material brazed to form an adequate seal at both ends, where they meet the primary seal 242 on the interior of the reactor 102 and where they each enters the secondary containment chamber 244. In other embodiments, however, one or both of the temperature sensor housing 224 and the pressure tubing 232 may terminate at the first end 204a of the support bar 202 or otherwise at the flange 208, without departing from the scope of the disclosure. As illustrated, the electrical conductors 228, 234, 240 extend into the secondary containment chamber 244.

A field termination box 299 is operatively coupled to the secondary containment chamber 244 and houses various electronic modules communicably coupled to the electrical conductors 228, 234, 240. A secondary seal 248 may seal the interface between the secondary containment chamber 244 and the field termination box 299, and the electrical conductors 228, 234, 240 extend through the secondary seal 248 to access the electronic modules housed within the field termination box 299. Similar to the primary seal 242, in some embodiments, the secondary seal 248 may comprise a pressure-rated, rubber seal system.

Electronic modules that may be housed within the field termination box 299 include, but are not limited to, one or more temperature signal transmitters 250, one or more pressure signal transmitters 252, and one or more static signal transmitters 254. While only one of each of the temperature, pressure, and static signal transmitters 250, 252, 254 is depicted in FIG. 2A, the field termination box 299 may house separate temperature signal transmitters 250 for each individual temperature sensor 220, separate pressure signal transmitters 252 for each individual pressure sensor 230, and separate static signal transmitters 254 for each individual electrostatic sensor 236. Accordingly, each of the temperature, pressure, and static signal transmitters 250, 252, 254 depicted in FIG. 2A may be representative of multiple temperature, pressure, and static signal transmitters 250, 252, 254 equal to the number of temperature, pressure, and electrostatic sensors 220, 230, 236, respectively, employed in the measurement probe 132 and the fluidization measurement system 200.

The electrical conductors 228, 234, 240 entering the field termination box 299 may be communicably coupled to the temperature, pressure, and static signal transmitters 250, 252, 254, respectively. More specifically, the first electrical conductor(s) 228 may be communicably coupled to the temperature signal transmitter(s) 250 and may thereby convey temperature measurements obtained by the temperature sensors 220 for processing. Similarly, the second electrical conductor(s) 234 may be communicably coupled to the pressure signal transmitter(s) 252 and may thereby convey pressure measurements obtained by the pressure sensors 230 for processing. Lastly, the third electrical conductor(s) 240 may be communicably coupled to the static signal transmitter(s) 254 and may thereby convey electrostatic charge measurements obtained by the electrostatic sensor(s) 236 for processing.

The fluidization measurement system 200 may further include a base plant control system 256, which may comprise, for example, a distributive control system (DCS) or the like. The temperature, pressure, and static signal transmitters 250, 252, 254 may each be in communication (wired or wireless) with the control system 256 and configured to convey temperature, pressure, and electrostatic charge data obtained by the temperature, pressure, and electrostatic sensors 220, 230, 236 to the control system 256. The control system 256 may include a computer having a processor configured to process the incoming data. Based on the measurements obtained by the temperature, pressure, and electrostatic sensors 220, 230, 236, and the known locations of each temperature, pressure, and electrostatic sensor 220, 230, 236 along the length 134 of the support rod 202, the real-time physical conditions and flow patterns of the fluidized bed 108 can be accurately mapped and profiled by the computer.

Mapping the physical conditions and flow patterns of the fluidized bed 108 can help operators determine real-time shifts in circulation patterns and solids concentrations within the fluidized bed 108. Accurate detection will allow corrective actions designed to improve fluidization parameters and overall bed continuity. Example corrective actions include, but are not limited to, temperature adjustments, pressure adjustments, antistatic inhibitor injection application-rate-amount, catalyst injection rates and amount, cycle gas compressor blade pitch, cycle gas velocity flow control valve adjustments, reactor inhibitor. injection timing-rate-amount, bed height control/product discharge system rate, or any combination thereof. Moreover, accurate detection and measurement of the physical conditions and flow patterns of the fluidized bed 108 can result in an increased service factor for the reactor 102, minimized or eliminated lengthy internal reactor wall treatments, and enhanced commercialization of new catalyst/product development.

Embodiment Listing

The present disclosure provides, among others, the following embodiments, each of which may be considered as optionally including any alternate embodiments.

Clause 1. A fluidization measurement system for a gas phase reactor containing a fluidized bed, the fluidization measurement system including a measurement probe coupled to a sidewall of the gas phase reactor and including a support bar penetrating the sidewall and extending into the fluidized bed to a distance of at least 12% of a diameter of the gas phase reactor, and a plurality of sensors arranged along a length of the support bar to obtain measurements of at least one of temperature, pressure, and electrostatic charge at multiple points within the fluidized bed. The fluidization measurement system further including a base plant control system in communication with the measurement probe to receive and process the measurements to determine real-time physical conditions and flow patterns of the fluidized bed.

Clause 2. The fluidization measurement system of Clause 1, wherein the measurement probe is coupled to the sidewall at a height ranging between about 3 feet and about 6 feet above a distributor plate positioned within the gas phase reactor.

Clause 3. The fluidization measurement system of Clause 1 or Clause 2, wherein the plurality of sensors includes a plurality of temperature sensors positioned within an arcuate channel defined in an outer surface of the support bar.

Clause 4. The fluidization measurement system of Clause 3, wherein at least one of the plurality of temperature sensors protrudes at least partially out of the arcuate channel.

Clause 5. The fluidization measurement system of any of the preceding Clauses, wherein the plurality of sensors includes a plurality of pressure sensors positioned within an arcuate channel defined in an outer surface of the support bar.

Clause 6. The fluidization measurement system of Clause 5, wherein at least one of the plurality of pressure sensors protrudes at least partially out of the arcuate channel.

Clause 7. The fluidization measurement system of any of the preceding Clauses, wherein the plurality of sensors includes an electrostatic sensor coupled to an end of the support bar, and wherein an elongate conduit is defined in the support bar to accommodate an electrical conductor coupled to the electrostatic sensor.

Clause 8. The fluidization measurement system of any of the preceding Clauses, wherein the measurement probe further includes a field termination box that houses one or more electronic modules communicably coupled to the plurality of sensors to receive the measurements obtained by the plurality of sensors, and wherein the one or more electronic modules are selected from the group consisting of one or more temperature signal transmitters, one or more pressure signal transmitters, and one or more static signal transmitters.

Clause 9. A measurement probe for a gas phase reactor containing a fluidized bed, the measurement probe including a support bar having a length extendable into the fluidized bed to a distance of at least 12% of a diameter of the gas phase reactor when the support bar is coupled to a sidewall of the gas phase reactor, and a plurality of sensors arranged along the length of the support bar to obtain measurements of at least one of temperature, pressure, and electrostatic charge at multiple points within the fluidized bed.

Clause 10. The measurement probe of Clause 9, wherein the support bar is made of stainless steel or a steel alloy.

Clause 11. The measurement probe of Clause 9 or Clause 10, wherein the plurality of sensors includes a plurality of temperature sensors positioned within a first arcuate channel defined in an outer surface of the support bar, and a plurality of pressure sensors positioned within a second arcuate channel defined in the outer surface of the support bar.

Clause 12. The measurement probe of Clause 11, wherein at least one of the plurality of temperature sensors and the plurality of pressure sensors protrudes at least partially out of the first and second arcuate channels, respectively.

Clause 13. The measurement probe of Clause 11, wherein one or both of the first and second arcuate channels is packed with a packing material that holds the plurality of temperature and pressure sensors in place within the first and second arcuate channels, respectively.

Clause 14. The measurement probe of Clause 11, wherein the plurality of sensors further includes an electrostatic sensor coupled to an end of the support bar, and wherein an elongate conduit is defined in the support bar to accommodate an electrical conductor coupled to the electrostatic sensor.

Clause 15. The measurement probe of any of Clauses 9 through 14, wherein the measurement probe further includes a field termination box that houses one or more electronic modules communicably coupled to the plurality of sensors to receive the measurements obtained by the plurality of sensors, and a secondary containment chamber operatively coupled to the support bar and interposing the support bar and the field termination box.

Clause 16. The measurement probe of any of Clauses 9 through 15, wherein the one or more electronic modules are selected from the group consisting of one or more temperature signal transmitters, one or more pressure signal transmitters, and one or more static signal transmitters.

Clause 17. A method of monitoring conditions within a gas phase reactor containing a fluidized bed, the method including obtaining measurements of at least one of temperature, pressure, and electrostatic charge at multiple points within the fluidized bed with a measurement probe coupled to a sidewall of the gas phase reactor, the measurement probe including a support bar penetrating the sidewall and extending into the fluidized bed to a distance of at least 12% of a diameter of the gas phase reactor, and a plurality of sensors arranged along a length of the support bar to obtain the measurements. The method further including receiving the measurements at a base plant control system in communication with measurement probe, and processing the measurements with the base plant control system to determine real-time physical conditions and flow patterns of the fluidized bed.

Clause 18. The method of Clause 17, wherein the plurality of sensors includes a plurality of temperature sensors positioned within a first arcuate channel defined in an outer surface of the support bar, and a plurality of pressure sensors positioned within a second arcuate channel defined in the outer surface of the support bar, the method further comprising obtaining temperature measurements at multiple points along the length of the support bar with the plurality of temperature sensors, and obtaining pressure measurements at multiple points along the length of the support bar with the plurality of pressure sensors.

Clause 19. The method of Clause 18, wherein the plurality of sensors further includes an electrostatic sensor coupled to an end of the support bar, the method further comprising obtaining electrostatic charge measurements with the electrostatic sensor.

Clause 20. The method of any of Clauses 17 through 19, wherein obtaining the measurements is preceded by removing a support tube coupled to a nozzle extending from the sidewall, and coupling the measurement probe to the nozzle.

Clause 21. The method of any of Clauses 17 through 20, further comprising undertaking one or more corrective actions based on the real-time physical conditions and flow patterns of the fluidized bed.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A fluidization measurement system for a gas phase reactor containing a fluidized bed, comprising:
a measurement probe coupled to a sidewall of the gas phase reactor and including:
a support bar penetrating the sidewall and extending into the fluidized bed to a distance of at least 12% of a diameter of the gas phase reactor; and
a plurality of sensors arranged along a length of the support bar to obtain measurements of at least one of temperature, pressure, and electrostatic charge at multiple points within the fluidized bed; and
a base plant control system in communication with the measurement probe to receive and process the measurements to determine real-time physical conditions and flow patterns of the fluidized bed.

2. The fluidization measurement system of claim 1, wherein the measurement probe is coupled to the sidewall at a height ranging between about 3 feet and about 6 feet above a distributor plate positioned within the gas phase reactor.

3. The fluidization measurement system according to claim 1, wherein the plurality of sensors includes a plurality of temperature sensors positioned within an arcuate channel defined in an outer surface of the support bar.

4. The fluidization measurement system of claim 3, wherein at least one of the plurality of temperature sensors protrudes at least partially out of the arcuate channel.

5. The fluidization measurement system according to claim 1, wherein the plurality of sensors includes a plurality of pressure sensors positioned within an arcuate channel defined in an outer surface of the support bar.

6. The fluidization measurement system of claim 5, wherein at least one of the plurality of pressure sensors protrudes at least partially out of the arcuate channel.

7. The fluidization measurement system according to claim 1, wherein the plurality of sensors includes an electrostatic sensor coupled to an end of the support bar, and wherein an elongate conduit is defined in the support bar to accommodate an electrical conductor coupled to the electrostatic sensor.

8. The fluidization measurement system according to claim 1, wherein the measurement probe further includes a field termination box that houses one or more electronic modules communicably coupled to the plurality of sensors to receive the measurements obtained by the plurality of sensors, and
wherein the one or more electronic modules are selected from the group consisting of one or more temperature signal transmitters, one or more pressure signal transmitters, and one or more static signal transmitters.

9. A measurement probe for a gas phase reactor containing a fluidized bed, comprising:
a support bar having a length extendable into the fluidized bed to a distance of at least 12% of a diameter of the gas phase reactor when the support bar is coupled to a sidewall of the gas phase reactor; and
a plurality of sensors arranged along the length of the support bar to obtain measurements of at least one of temperature, pressure, and electrostatic charge at multiple points within the fluidized bed.

10. The measurement probe of claim 9, wherein the support bar is made of stainless steel or a steel alloy.

11. The measurement probe according to claim 9, wherein the plurality of sensors includes:
a plurality of temperature sensors positioned within a first arcuate channel defined in an outer surface of the support bar; and
a plurality of pressure sensors positioned within a second arcuate channel defined in the outer surface of the support bar.

12. The measurement probe of claim 11, wherein at least one of the plurality of temperature sensors and the plurality of pressure sensors protrudes at least partially out of the first and second arcuate channels, respectively.

13. The measurement probe of claim 11, wherein one or both of the first and second arcuate channels is packed with a packing material that holds the plurality of temperature and pressure sensors in place within the first and second arcuate channels, respectively.

14. The measurement probe of claim 11, wherein the plurality of sensors further includes an electrostatic sensor coupled to an end of the support bar, and wherein an elongate conduit is defined in the support bar to accommodate an electrical conductor coupled to the electrostatic sensor.

15. The measurement probe according to claim 9, wherein the measurement probe further includes:

a field termination box that houses one or more electronic modules communicably coupled to the plurality of sensors to receive the measurements obtained by the plurality of sensors; and a secondary containment chamber operatively coupled to the support bar and interposing the support bar and the field termination box.

16. The measurement probe according to claim 9, wherein the one or more electronic modules are selected from the group consisting of one or more temperature signal transmitters, one or more pressure signal transmitters, and one or more static signal transmitters.

17. A method of monitoring conditions within a gas phase reactor containing a fluidized bed, comprising:

obtaining measurements of at least one of temperature, pressure, and electrostatic charge at multiple points within the fluidized bed with a measurement probe coupled to a sidewall of the gas phase reactor, the measurement probe including:

a support bar penetrating the sidewall and extending into the fluidized bed to a distance of at least 12% of a diameter of the gas phase reactor; and a plurality of sensors arranged along a length of the support bar to obtain the measurements;

receiving the measurements at a base plant control system in communication with the measurement probe;

processing the measurements with the base plant control system to determine real-time physical conditions and flow patterns of the fluidized bed, and, undertaking one or more corrective actions based on the real-time physical conditions and flow patterns of the fluidized bed.

18. The method of claim 17, wherein the plurality of sensors includes a plurality of temperature sensors positioned within a first arcuate channel defined in an outer surface of the support bar, and a plurality of pressure sensors positioned within a second arcuate channel defined in the outer surface of the support bar, the method further comprising:

obtaining temperature measurements at multiple points along the length of the support bar with the plurality of temperature sensors; and obtaining pressure measurements at multiple points along the length of the support bar with the plurality of pressure sensors.

19. The method of claim 18, wherein the plurality of sensors further includes an electrostatic sensor coupled to an end of the support bar, the method further comprising obtaining electrostatic charge measurements with the electrostatic sensor.

20. The method according to claim 17, wherein obtaining the measurements is preceded by:

removing a support tube coupled to a nozzle extending from the sidewall; and coupling the measurement probe to the nozzle.

* * * * *